April 25, 1967  N. N. FENDER  3,315,538
MECHANISM CONTROL

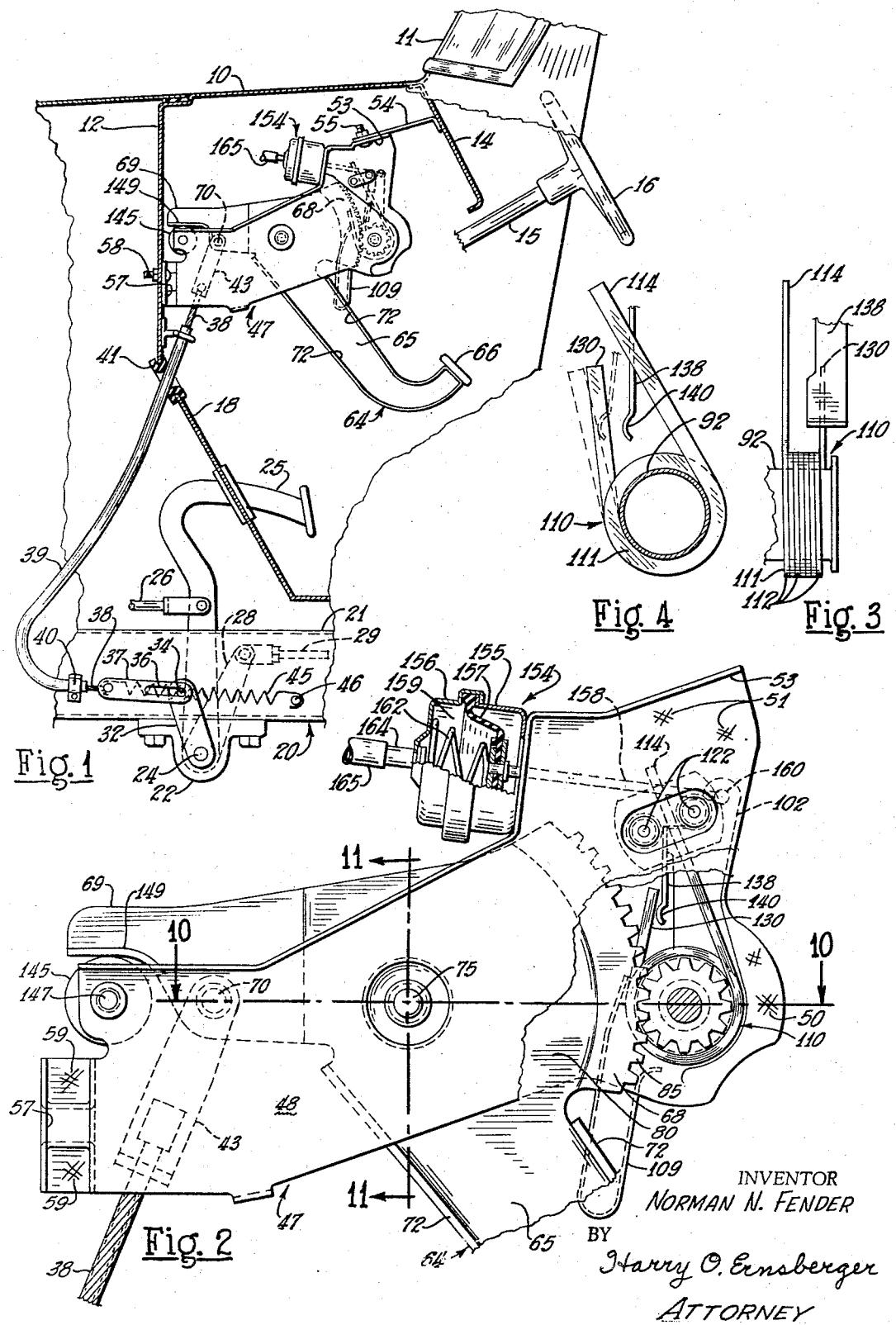

Filed Feb. 5, 1965  3 Sheets-Sheet 2

INVENTOR
NORMAN N. FENDER
BY
Harry O. Ernsberger
ATTORNEY

April 25, 1967
N. N. FENDER
3,315,538
MECHANISM CONTROL
Filed Feb. 3, 1965
3 Sheets-Sheet 3
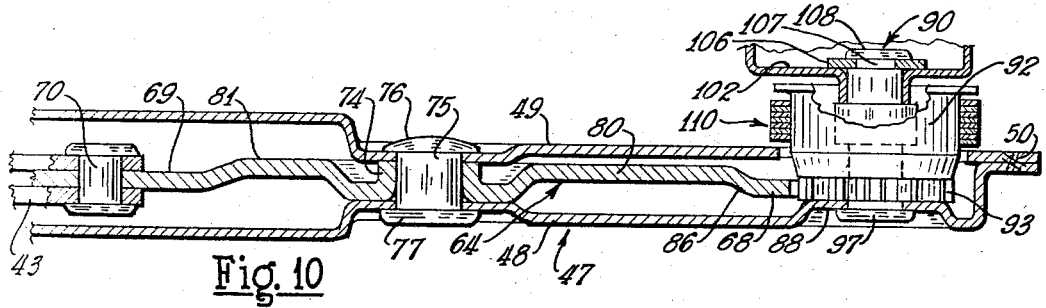
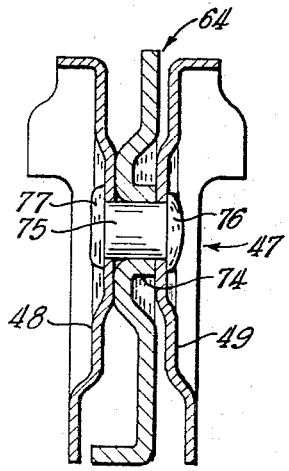
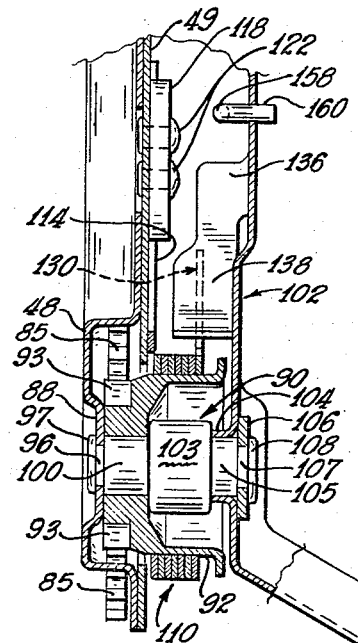
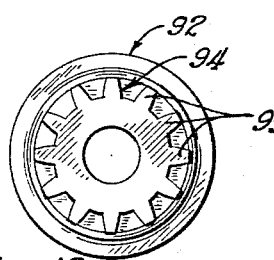
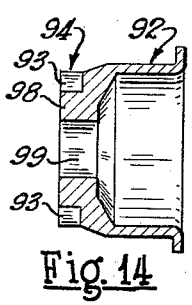
INVENTOR.
NORMAN N. FENDER
BY
Harry O. Ernsberger
ATTORNEY

United States Patent Office 3,315,538
Patented Apr. 25, 1967

3,315,538
MECHANISM CONTROL
Norman N. Fender, Erie, Mich., assignor to Universal American Corporation, New York, N.Y., a corporation of Delaware
Filed Feb. 3, 1965, Ser. No. 429,974
6 Claims. (Cl. 74—531)

This invention relates to mechanism control and more especially to mechanism for actuating and controlling the parking or emergency brakes of a vehicle.

The parking brakes of a vehicle are usually controlled or operated by manually actuated or foot actuated mechanism equipped with means or devices for holding the parking brakes in brake-setting position. Retaining mechanisms have been employed such as ratchet and pawl means and frictional rolls for retaining the brake actuating mechanism in brake-setting position, such retaining means being releasable either by manual or foot-operated means or power actuated means.

Recent developments have been made wherein a coiled element or spring-like device embraces a rotatable element or drum connected through motion multiplying means with a foot-operated brake actuating member wherein the coiled element is prestressed and of a diameter to setup friction between the rotatable element and the coiled element to grip the drum for holding the brake actuating means in brake-setting position.

In mechanism control of this character, release of the brake retaining means is effected by relieving the frictional grip of the coiled element on the rotatable drum whereby the brake actuating means, under the influence of the conventional brake springs, is returned to brake release position. In such devices one end of the coiled element is anchored to a support and the other end is relatively movable to a position to partially uncoil the spring to an extent to relieve the friction between the drum and the coiled element to effect release of the brake actuating means.

In devices of this character in which a pedal lever is employed as a brake-setting component, the teeth of a sector member carried by the pedal lever are enmeshed with a pinion associated with the rotatable drum, the toothed sector being an independent member bolted or otherwise secured to the pedal and which has been hardened to provide hardened teeth on the sector member. The use of a hardened sector member has presented difficulties in that the sector member tends to warp during hardening and additionally, special means have been employed for mounting the sector on the pedal lever in a manner to be rotatable with the pedal lever employed for setting the brakes.

The present invention embraces the provision of a brake actuating mechanism especially usable for actuating and controlling the parking or emergency brakes of a vehicle, the actuating mechanism embodying a retaining means including a coiled element surrounding a rotatable element or drum as a brake retaining means wherein the rotatable element is actuated by a toothed region of the lever member or pedal lever wherein the teeth are integrally formed on the actuating lever member or pedal.

Another object of the invention resides in a parking brake actuating and retaining means wherein a foot-operated lever or pedal member is fashioned with a toothed rack or sector portion integral with the lever, the teeth of the sector portion actuating a rotatable element adapted to be held in brake-setting position by a coiled element embracing the same, the teeth on the lever or pedal being unhardened thereby avoiding warpage stresses in the fabrication of the combined lever and rack construction.

Another object of the invention resides in a parking brake actuating and controlling mechanism wherein a foot-operated lever is formed with an integral toothed sector portion cooperating with a lever retaining means whereby the construction may be made more economical with a minimum number of components and secure reliable operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a portion of the operator's compartment of a vehicle illustrating a form of mechanism control of the invention;

FIGURE 2 is a side elevational view of the mechanism control shown in FIGURE 1 illustrating the mechanism in brake reelase position;

FIGURE 3 is a front elevational view of a coiled locking element and drum construction of the lever retaining means;

FIGURE 4 is a side elevational view of the construction shown in FIGURE 3;

FIGURE 10 is a sectional view taken substantially on the line 10—10 of FIGURE 2;

FIGURE 11 is a detail sectional view taken substantially on the line 11—11 of FIGURE 2;

FIGURE 12 is a detail sectional view illustrating the coiled element and drum construction and a release means associated with the coiled element;

FIGURE 13 is an end view illustrating the drum and pinion construction, and

FIGURE 14 is a sectional view of the construction shown in FIGURE 13.

Figure 5:
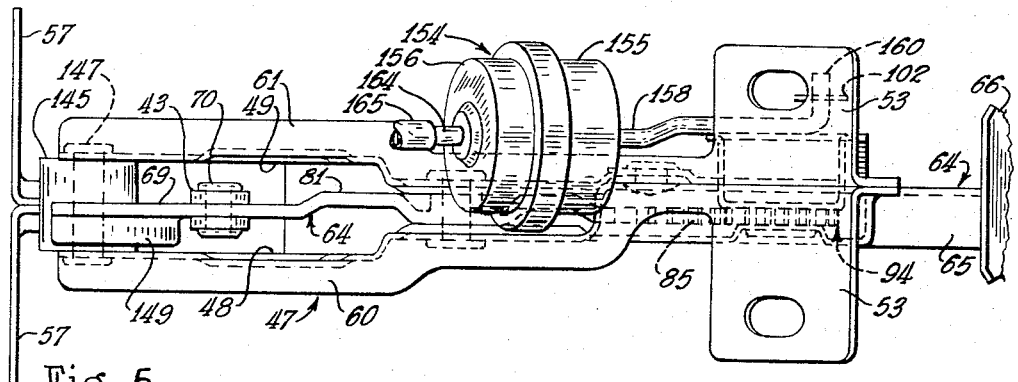
FIGURE 5 is a top plan view of the construction shown in FIGURE 2.

While the mechanism control of the invention is illustrated as particularly usable for actuating and controlling the parking or emergency brakes of a vehicle, it is to be understood that the mechanism control of the invention may be employed wherever it may be found to have utility.

Referring to the drawings and initially to FIGURE 1, there is illustrated a portion of the operator's compartment of an automotive vehicle and part of the vehicle frame construction. The vehicle includes a cowl 10, a windshield 11, a dashboard or firewall 12, an instrument panel 14, a steering post 15 and a steering wheel 16. A floor construction 18 forms a continuation of the firewall 12.

The vehicle includes a chassis frame 20 which includes parallel frame members extending lengthwise of the vehicle, one of which is shown at 21, the frame members 21 being joined by cross members (not shown) of conventional construction.

Secured to the frame members 21 are brackets 22 journally supporting a transversely extending shaft 24 which provides a support for a service brake pedal 25 to which is connected a rod 26 adapted to actuate hydraulic means (not shown) of conventional construction for setting the service brakes of the vehicle. Fixedly mounted upon the shaft 24 is an arm 28 connected by a rod 29 with the vehicle parking or emergency brakes associated with road wheels of the vehicle (not shown), the parking brakes being of conventional construction.

Secured on the shaft 24 is a second arm 32 provided at its distal end with a pin 34 extending into a slot 36 provided in a connecting link 37. The link 37 is connected to one end of a flexible cable 38 contained within a tubular member or sheath 39, the lower end of the sheath 39 being secured to a frame member 21 by a clip 40. The sheath 39 and cable 38 extend through a rubber grommet 41 disposed in an opening in the floor 18, the upper end of the flexible cable 38 being equipped with a clevis 43 for articulate connection with a parking brake actuating lever construction hereinafter described.

One end of a contractile coil spring 45 is anchored to a frame member 21 by a pin 46, the other end of the spring 45 being connected to the link 37. The spring 45, together with the conventional brake shoe retracting springs (not shown) normally bias the link 37 and cable 38 toward brake release position.

The parking brake actuating and control mechanism is mounted upon a support, support means or frame 47, preferably fashioned of two mating sheet metal sections 48 and 49 welded together at regions indicated at 50 and 51. The end regions of the frame members 48 and 49 adjacent the instrument panel 14 are fashioned with flanges or pad portion 53 secured to a bracket 54 by bolts 55, the bracket 54 being welded or otherwise secured to the instrument panel 14. The end regions of the support members 48 and 49 adjacent the firewall 12 are provided with transversely extending flanges or pads 57 secured to the firewall 12 by bolts 58.

The regions of the members 48 and 49 adjacent the pads 57 are welded together as shown at 59. The upper portions of the support sections 48 and 49 are respectively formed with laterally extending reinforcing flanges 60 and 61. The brake actuating mechanism includes a brake actuator, lever or pedal 64 pivotally mounted or fulcrumed on the support means 47. As illustrated in the drawings, the actuator 64 is a foot-operated lever.

The foot-operated lever 64 is of one piece construction of metal such as steel, having a depending portion 65 to which the foot pad portion 66 is secured. The lever 64 includes an arcuately shaped sector portion 68 and a projecting portion 69 to which the clevis member 43 is connected by means of a rivet or pin 70. The depending portion 65, the sector portion 68 and the projection 69 are integrally formed as a unit. The depending portion 65 of the lever is reinforced by laterally extending flanges 72.

The lever 64 is fashioned with an integral hub portion 74 shaped to accommodate a fulcrum pin or rivet 75 which forms a fulcrum for the lever.

The rivet or pin 75 extends through aligned openings formed in the support members 48 and 49, the head 76 of the rivet being adjacent one of the frame members and the rivet being swaged in assembly as at 77 into contact with the other of the members as shown in FIGURES 10 and 11. Through the provision of the hub portion 74, a bearing of substantial surface area is provided between the pin or rivet 75 and the lever 64.

The lever member 64 is formed of comparatively thick sheet metal such as sheet steel of a thickness of approximately one-eighth of an inch. Portions 80 and 81 of the body of the lever member are offset laterally from the sector portion 68 and the projecting portion 69 as shown in FIGURE 10 to provide increased rigidity for the lever construction to prevent lateral distortion of portions of the lever under brake applying pressures.

Formed integrally with the body portion 80 at the right-hand region, as viewed in FIGURE 2, is the arcuate or sector-shaped portion 68 the periphery of which is formed with teeth 85 providing a rack construction. The transition region between portion 80 and the offset arcuate portion 68 is illustrated at 86 in FIGURE 10.

As shown in FIGURES 10 and 12, the support section 48 is configured with an inwardly extending or depressed circular region 88 providing a support for a stub shaft or trunnion 90 on which is journally mounted a rotatable element or drum 92 integrally formed or fashioned with pinion teeth 93 forming a pinion portion 94, shown in detail in FIGURES 12, 13 and 14. The trunnion or journal pin or shaft 90 is fashioned with a tenon portion 96 of reduced diameter which extends through an opening in the depressed portion 88 of the support means, the pin being secured to the portion 88 by swaging the end of the tenon 96 to the configuration shown at 97.

The rotatable member or drum 92 is formed with a hub portion 98 having an axial opening 99 accommodating a portion 100 of the shaft 90, the drum being rotatably mounted on the shaft portion 100. The teeth 93, providing the pinion construction 94 of the drum 92, are enmeshed with the teeth 85 provided on the arcuate portion 69 of the lever construction. Upon rotation of the lever 64 about its fulcrum pin 75, the drum 92 will be rotated by reason of the enmeshment of the teeth 85 with the pinion teeth 93.

Figure 6:
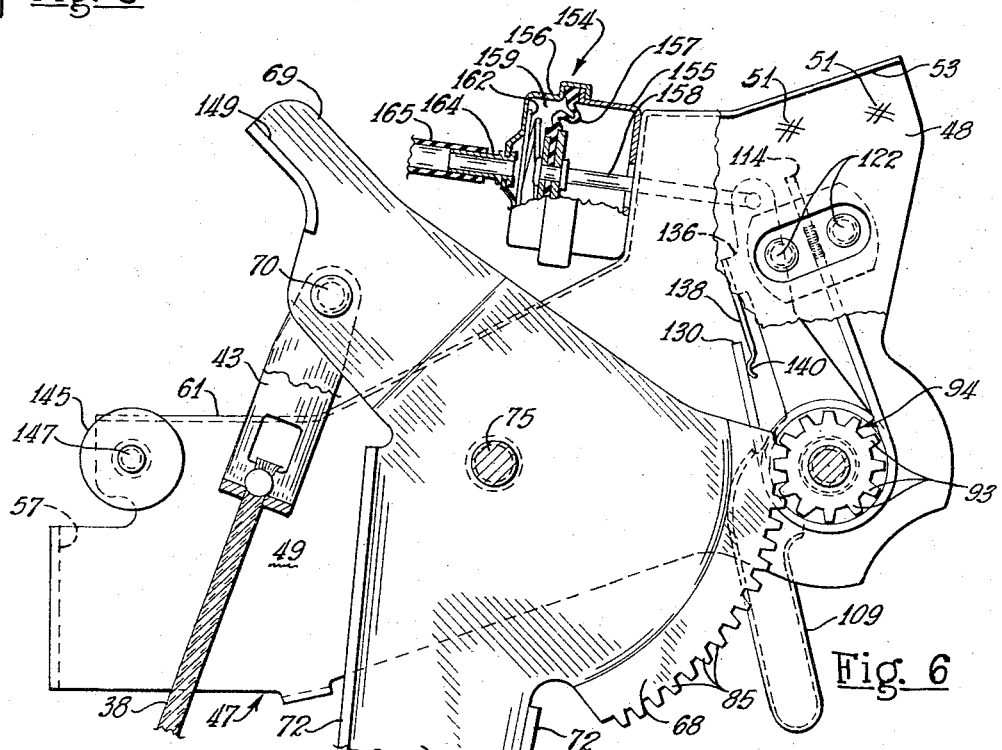
FIGURE 6 is a view similar to FIGURE 2 showing the components of the brake actuating and control mechanism in brake "set" position.

It will be apparent from FIGURES 2 and 6 that the radial distance or the radius of the pitch line of the teeth 85 on the sector portion 68 from the axis of the fulcrum pin 75 is several times the distance of the radius of the pitch line of the teeth 93 of the pinion 94 from the axis of the drum 92, the distance being approximately in a ratio of five to one. However, the pitch circles of the teeth 85 on the sector 68 and the teeth 93 on the pinion portion 94 may be of different ratio if desired. Thus, through the sector rack and pinion construction, a motion multiplying or force reducing arrangement is provided whereby a proportionately reduced force is required to hold the brake actuating lever 64 and parking brakes in brake-setting positions.

The arrangement is inclusive of a release means or member 102 for controlling or releasing a lever locking means or braking device cooperating with the drum 92, a construction which will be hereinafter described. The release member 102 is preferably formed of sheet metal fashioned with an inwardly extending circular flange 104 journally mounted upon a portion 105 of the trunnion 90 providing for relative pivotal movement of the release member 102 about the axis of the trunnion 90.

A washer 106 is received on a tenon portion 107 of the trunnion or shaft 90, the end region of the tenon 107 being swaged in assembly as shown at 108 to retain the member 102 on the shaft portion 105.

An enlarged central portion 103 formed on the trunnion 90 maintains the drum 92 in proper position on the shaft portion 100 with the teeth of the pinion 94 enmeshed with the sector teeth 85. The member 102 is formed with a hand grip portion 109 for manipulating the member.

A lever retaining member, locking means or brake device 110 cooperates with the drum 92 providing an effective means for retaining or holding the lever construction 64 and parking brake mechanism in brake-setting positions. The retaining or locking means 110 is formed or provided with a coil spring-like section 111 provided by a plurality of close convolutions 112, the strip of material providing the means 110 being of hardened spring steel or similar material. The strip material forming the lever retaining or locking means 110 is comparatively thin in relation to its width, as particularly shown in FIGURES 3 and 4.

The convolutions 112 are flat and are wound in close relation as illustrated in FIGURES 3, 10 and 12 of the drawings. The interior diameter of the coil spring section or portion 111 of the means 110 is of a dimension to normally snugly fit onto the exterior cylindrical surface of the drum 92, the interior edges of the convolutions 112 of the spring portion being preferably rounded. The convolutions or coils 112 are wound and prestressed in hardening whereby they normally frictionally grip the exterior surface of the drum 92 providing a brake or lock for holding the drum, lever and parking brakes in "set" position.

The means 110 is formed with one terminal portion 114 which is adapted to be anchored or fixedly secured to the support section 49 of the support means in the manner illustrated in FIGURES 2 and 12. When the stresses on the locking element 110 of retaining the parking brakes in brake-setting position are communicated from the lever 64 through the teeth 85, pinion 94 and drum 92 to the locking element, tension setup in the terminal portion 114 is of substantial magnitude. To obtain satisfactory operation of the lever locking or retaining means, the terminal portion 114 must be positively secured against dislodgement.

Figure 7:
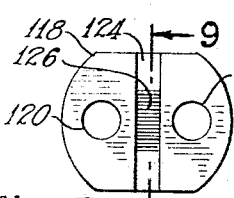
FIGURE 7 is a plan view of an anchor means for one end of a coiled element of the retaining means.
Figure 9:
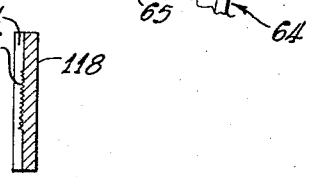
FIGURE 9 is a sectional view of the anchor element, the view being taken substantially on the line 9—9 of FIGURE 7.
Figure 8:
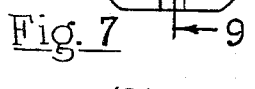
FIGURE 8 is a side elevational view of the anchor means.

The anchor or clamp member 118, shown in detail in FIGURES 7, 8 and 9, is in the form of a flat plate or disc having openings 120 accommodating securing rivets 122, shown in FIGURES 2, 6 and 12, securing the anchor member 118 to the member 49 of the support means 47. As shown in FIGURES 7, 8 and 9, the member 118 is provided with a shallow groove or recess 124 of a width and depth to snugly accommodate the terminal portion 114 of the lever locking means 110.

The bottom of the recess or groove 124 is provided with a serrated or roughened region 126 providing upwardly extending ridges or projections for direct intimate engagement with a surface of the terminal portion 114 when the latter is assembled with the anchor member engaging the frame section 49.

When the rivets 122 are swaged into securing relation with the support section 49 of the support means, the terminal portion 114 is positively secured between the adjacent surface of the support section 49 and the roughened region 126. This form of anchor means resists the high stresses of lengthwise tension in the terminal portion 114 under the impact of brake-setting operations.

The opposite end region or terminal portion 130 is unsecured and disposed for freedom of movement to enable the convolutions 112 to normally frictionally grip the surface of the drum 92. The hardened and prestressed convolutions 112 of the retaining means 110 are dimensioned so as to inherently frictionally grip the exterior surface of the drum 92, the gripping characteristics of the convolutions being adequate to retain or hold the brake actuating mechanism in "brake-set" position.

The convolutions 112 are coiled in a direction whereby rotation of the drum 92 during brake-setting movement of the lever or actuator 64 tends to unwind the convolutions in a counterclockwise direction, as viewed in FIGURES 2 and 4, offering a minimum of frictional resistance or drag between the drum 92 and the convolutions 112 during movement of the lever 64 toward brake-setting position.

As the radical distance of the rack teeth 85 from the axis of the fulcrum pin 75 is several times greater than the radial distance of the pinion teeth 94 from the axis of the drum 92, a motion multiplying or force reducing arrangement is provided whereby substantial rotation of the drum 92 is attained as compared with the angular movement of the lever 64 in setting the brakes, and the locking force required of the retaining means 110 is proportionately reduced for holding the drum 92 in a brake-setting position.

It is found that a very slight relative movement of the distal or free terminal portion 130 in a direction tending to unwind the convolutions 112 is sufficient to release or render ineffective the frictional grip of the convolutions 111 on the drum 92 whereby the conventional brake springs, cooperating with the spring 45, shown in FIGURE 1, return the lever or pedal 64 to its initial brake release position shown in FIGURES 1 and 2. The release member 102, shown particularly in FIGURE 12, is fashioned with a manipulating or hand grip portion 109 which extends downwardly from the support means 47.

The member 102 is fashioned with a portion 136 having an integral downwardly extending projection 138 terminating in an arcuately shaped or curved portion 140 normally disposed adjacent but spaced from the terminal portion 130, as shown in FIGURE 2.

When the releasing member 102 is rotated in a counterclockwise direction as viewed in FIGURES 2 and 6, the curved portion 140 of projection 138 engages the terminal portion 130 of the retaining means 110 and moves the terminal portion in a left-hand direction tending to slightly unwind the convolutions 112, which action releases the gripping force of the convolutions on the drum 92 to release the brake actuating lever 64 for movement to brake release position.

Means is provided for cushioning the impact of return movement of the lever 64 to brake release position. As shown in FIGURES 2, 5 and 6, there is disposed between the support sections 48 and 49 a cylindrically shaped buffer or abutment element 145 fashioned of semi-hard rubber or similar resilient material. The buffer 145 is supported upon a rivet or pin 147 extending through aligned openings in the support sections 48 and 49 and the buffer element. The extending portion 69 of the lever 64 is integrally provided with a transversely extending pad portion 149 adapted to engage the buffer element 145 when the lever 64 approaches brake release position.

In addition to the manually operable release means 102 for manipulating the terminal portion 130 of the drum retaining means 110, power means may be employed to effect movement of the member 102 to release the coiled means 111 from locking engagement with the drum 92. A form of power actuated means or servo-motor 154 is illustrated in FIGURES 1, 2, 5 and 6.

The servo-motor 154 illustrated is of a conventional fluid-actuated diaphragm type and is inclusive of a housing formed of two cup-like sections 155 and 156 with a flexible diaphragm 157 of impervious material disposed between the housing sections.

The diaphragm 157 is connected with one end of a rod 158, the opposite end of the rod being formed with a transversely extending portion 160 which is received in an opening provided in the upper end of the release member 102 as shown in FIGURE 12. An expansive coil spring 162 is disposed between an end wall of housing 156 and the diaphragm 157 for normally urging the rod 158 in a right-hand direction as viewed in FIGURES 2 and 6, maintaining the release member out of engagement with the terminal portion 130 of the retaining means 110.

The chamber 159 defined by the housing 156 at the left side of the diaphragm 157, as viewed in FIGURES 1 and 6, is provided with a spud or nipple 164 connected by a flexible tubular member 165 with a source of reduced or subatmospheric pressure as, for example, the intake manifold of the internal combustion engine of the vehicle. Valve means (not shown) of conventional construction is associated with the tubular member 165 to control the transmission of reduced pressure to the chamber 159 to flex the diaphragm 157 in a left-hand direction to move the rod 158 in a left-hand direction as viewed in FIGURES 2 and 6, and actuate the member 102 to engage the pad portion 140 with the terminal portion 130 of the coiled element as shown in FIGURE 6 to release the gripping force of the coiled element on the drum 92.

It is to be understood that other types of motive power may be used to actuate the release member 102. The chamber provided by the housing section 155 is vented to facilitate movement of the diaphragm.

It has been found that the number of convolutions in the coiled spring or coiled member 111 may be three or more, and tests have indicated that about seven convolutions provide an effective gripping force on the drum 92 to retain the parking brakes in set position.

In the arrangement of the invention the sector portion 68 integral with the lever 64 and the teeth 85 formed on the sector portion are not hardened so that the teeth may be formed as integral components of the lever 64. The lever 64 may be blanked out from a flat sheet of metal, the teeth 85 being formed by the blanking operation. Through this method of formation of the lever 64, the cost of producing the lever is greatly reduced over prior constructions.

As the thickness of the metal of the lever 64 is about an eighth of an inch, such width provides adequate surface area of the teeth 85 of the sector portion 68 and the teeth 93 of the pinion portion 94 of the drum 92. It is found that the unhardened teeth are capable of long life and as there is no hardening operation involved, the sector portion 84 and teeth 85 are not warped or distorted in processing operations in producing the lever construction.

The method of operation of the brake actuating arrangement is as follows: The control mechanism is illustrated in brake release position in FIGURES 1 and 2 with the portion 149 of the lever in engagement with the buffer element 145. The release member 102 is normally biased out of engagement with the terminal portion 130 under the expansive coil spring 162 of the servo-motor 154. If the power actuated release mechanism is not utilized for actuating the release member 102, a spring means of conventional construction is employed to bias the member 102 with the portion 140 out of engagement with the terminal portion 130.

The vehicle operator, desiring to set the parking brakes, exerts foot pressure on the pad portion 66 of the lever 64 to swing the lever about its fulcrum 75 in a clockwise direction as viewed in FIGURES 1, 2 and 6. This effects upward movement of the brake cable 38 and the teeth 85 on the sector portion of the lever enmeshed with the teeth 94 on the drum 92 effects counterclockwise rotation of the drum 92. This rotation of the drum 92 tends to unwind the convolutions 112 of the coiled element 111 of the locking means 110 so that only minor frictional force is present between the convolutions 112 and the surface of the drum 92 which is easily overcome by foot pressure on the lever 64.

When the brakes have been moved to set position, rotation of the drum ceases and the inherent stress in the coiled element 111 causes the convolutions 112 to securely grip the drum 92 and prevent reverse rotation of the drum, thereby holding the parking brakes in set position. When it is desired to release the brakes the operator may manually move the member 102 about its pivotal support 90 in a counterclockwise direction as viewed in FIGURES 2 and 6, to engage the curved portion 140 of the release member with the terminal portion 130 of the coiled locking element, moving the terminal portion 130 to the broken line position indicated in FIGURE 4.

This movement tends to unwind the convolutions 112 releasing the drum 92 which through intermeshment of the gear of the pinion teeth 94 with the teeth 85 on the lever, permits the brakes to be released under the influence of the brake springs (not shown).

Where the power release means or servo-motor 154 is employed, the valve means (not shown) connected with the tubular member 165 is usually interconnected with the vehicle transmission control whereby movement of the transmission control away from neutral position actuates such valve means to establish subatmospheric or reduced pressure effective on the diaphragm 157 to move the same in a left-hand direction as viewed in FIGURES 2 and 6, to thereby move the rod 158 and actuate member 102 to move the terminal portion 130 of the coiled element of drum-releasing position.

After release of the drum 92 and movement of the lever 64 to a brake release position, the valve means controlling the pressure in the chamber 167 is arranged to reestablish atmospheric pressure in the chamber in a conventional manner whereby the expansive force of the spring 162 returns the member 102 to its normal position out of engagement with the terminal portion 130.

It is apparent that, within the scope of the invention, modifications and different arrangements may be made other than as herein disclosed, and the present disclosure is illustrative merely, the invention comprehending all variations thereof.

I claim:

1. Mechanism for controlling parking brakes of a vehicle, in combination, support means, a brake actuator pivotally mounted by the support means for movement relative thereto, a rotatable member journaled for rotation on an axis spaced from the pivotal axis of the actuator, a rack portion integral with the actuator, a plurality of teeth on the rotatable member in constant engagement with the teeth of the rack portion of the actuator whereby relative movement of the actuator effects rotation of the rotatable member, an element engaging the rotatable member normally locking the member in positions to which it is moved by the actuator, means anchoring one portion of the element to the support means, and means mounted by the support means engageable with another portion of the member movable to release the member from locking engagement with the rotatable member.

2. Mechanism for controlling parking brakes of a vehicle, in combination, support means, a brake actuator pivotally mounted by the support means for movement relative thereto, a rotatable element journaled for rotation on an axis spaced from the pivotal axis of the actuator, a rack portion integral with the actuator, a plurality of teeth on the rotatable member in constant engagement with the teeth of the rack portion of the actuator whereby relative movement of the actuator effects rotation of the rotatable element, a coiled element embracing the rotatable element normally locking the rotatable element in positions to which it is moved by the actuator, said coiled element having terminal portions, means anchoring one portion of the coiled element to the support means, and another portion of the coiled element being movable relative to the anchored portion to release the coiled element from locking engagement with the rotatable element.

3. Mechanism for controlling parking brakes of a vehicle, in combination, support means, a brake actuator fulcrumed on the support means for movement relative thereto, journal means carried by the support means, a rotatable element journaled for rotation on the journal means, a rack portion integral with the actuator, a plurality of teeth on the rotatable element in constant engagement with the teeth of the rack portion of the acutator whereby relative movement of the actuator effects rotation of the rotatable element, a coiled element embracing the rotatable element normally locking the rotatable element in positions to which it is moved by the actuator, said coiled element having terminal portions, means anchoring one of the terminal portions to the support means, the other terminal portion being movable relative to the anchored terminal portion to release the coiled element from locking engagement with the rotatable element.

4. Mechanism for controlling parking brakes of a vehicle, in combination, support means, a foot-operated brake actuator pivotally mounted by the support means for movement relative thereto, said actuator having an integral arcuate portion, a plurality of teeth integral with the arcuate portion of the actuator, a shaft carried by the support means at a region spaced from the pivotal mounting of the brake actuator, a rotatable drum journaled on the shaft, a plurality of teeth carried by the drum in constant enmeshment with the teeth on the actuator, a constriction element embracing the rotatable element to frictionally lock the element in positions to which it is moved by the actuator, one portion of said constriction element being anchored to the support means, and another portion of the constriction element being movable relative to the anchored portion to effect release of the constriction element with the rotatable element.

5. Mechanism for controlling parking brakes of a vehicle, in combination, support means, a foot-operated brake actuator pivotally mounted by the support means for movement relative thereto, said actuator having an integral arcuate portion laterally offset from an adjacent portion of the actuator, a plurality of teeth integral with the arcuate portion of the actuator, a shaft carried by the support means at a region spaced from the pivotal mounting of the brake actuator, a rotatable drum journaled on the shaft, a plurality of teeth carried by the drum in constant enmeshment with the teeth on the actuator, a coiled element embracing the rotatable drum to frictionally lock the drum in positions to which it is moved by the actuator, said coiled element having terminal portions, one terminal portion of the coiled element being anchored to the support means, and another terminal portion of the coiled element being movable relative to the anchored portion to effect release of the coiled element from locking engagement with the rotatable drum.

6. Mechanism for controlling parking brakes of a vehicle, in combination, support means, a brake actuator pivotally mounted by the support means for movement relative thereto and having an integral arcuate portion, a plurality of teeth integral with the arcuate portion of the actuator, a shaft carried by the support means at a region spaced from the pivotal mounting of the brake actuator, a rotatable drum journaled on the shaft, pinion teeth carried by the drum in constant enmeshment with the teeth on the actuator, the radial pitch of the teeth on the actuator being greater than the radial pitch of the pinion teeth of the drum, the arcuate portion of the actuator and the teeth on the actuator being approximately one-eighth of an inch in thickness, a coiled element having convolutions embracing the rotatable drum stressed to normally engage and lock the drum in positions to which it is moved by the actuator, said coiled element having terminal portions, means anchoring one terminal to the support means, the other terminal being movable relative to the anchored terminal to effect release of locking engagement of the coiled element with the drum, and a member mounted by the support means having a portion for engagement with the relatively movable terminal portion to actuate said coiled element to drum releasing position.

References Cited by the Examiner
UNITED STATES PATENTS

| | | | |
|---|---|---|---|
| 725,955 | 4/1903 | Graham et al. | 74—577 |
| 3,149,500 | 9/1964 | Swats et al. | 74—531 |

FRED C. MATTERN, Jr., *Primary Examiner.*

W. S. RATLIFF, *Assistant Examiner.*